US006970555B1

(12) United States Patent
Hamilton

(10) Patent No.: US 6,970,555 B1
(45) Date of Patent: Nov. 29, 2005

(54) FAULT TOLERANT TELEPHONY CONTROL

(75) Inventor: Thomas Hamilton, Marlborough, MA (US)

(73) Assignee: Cisco Technology, Inc., San Jose, CA (US)

( * ) Notice: Subject to any disclaimer, the term of this patent is extended or adjusted under 35 U.S.C. 154(b) by 43 days.

(21) Appl. No.: 10/672,361

(22) Filed: Sep. 26, 2003

Related U.S. Application Data

(63) Continuation of application No. 09/652,445, filed on Aug. 31, 2000, now Pat. No. 6,690,789.

(51) Int. Cl.[7] .................. H02H 3/05; H03K 19/003; H04B 1/74; H04L 1/22; H04M 3/08
(52) U.S. Cl. .................. 379/279; 370/217; 370/225; 379/9; 379/265.02; 709/203; 714/2
(58) Field of Search ............... 370/216, 217, 370/225; 379/9, 9.06, 221.03, 221.04, 265.02, 379/268, 269, 279; 709/203; 714/2

(56) References Cited

U.S. PATENT DOCUMENTS

| | | | |
|---|---|---|---|
| 3,912,873 | A | 10/1975 | Skaperda |
| 4,289,934 | A | 9/1981 | Pitroda et al. |
| 4,400,587 | A | 8/1983 | Taylor et al. |
| 4,466,098 | A | 8/1984 | Southard |
| 4,527,157 | A | 7/1985 | Krikor |
| 4,605,928 | A | 8/1986 | Georgious |
| 4,674,036 | A | 6/1987 | Conforti |
| 4,700,381 | A | 10/1987 | Eher |
| 4,723,273 | A | 2/1988 | Diesel et al. |
| 4,737,983 | A | 4/1988 | Frauenthal et al. |
| 4,755,995 | A | 7/1988 | Anderson et al. |
| 4,866,763 | A | 9/1989 | Cooper et al. |
| 4,879,743 | A | 11/1989 | Burke et al. |
| 4,881,261 | A | 11/1989 | Oliphant et al. |
| 4,951,310 | A | 8/1990 | Honda et al. |
| 4,988,209 | A | 1/1991 | Davidson et al. |
| 5,008,930 | A | 4/1991 | Gawrys et al. |
| 5,023,868 | A | 6/1991 | Davidson et al. |
| 5,027,384 | A | 6/1991 | Morganstein |
| 5,029,196 | A | 7/1991 | Morganstein |
| 5,031,211 | A | 7/1991 | Nagai et al. |
| 5,036,535 | A | 7/1991 | Gechter et al. |
| 5,062,103 | A | 10/1991 | Davidson et al. |

(Continued)

FOREIGN PATENT DOCUMENTS

WO 92/09164 5/1992

(Continued)

OTHER PUBLICATIONS

"Software License, Hardware Purchase and Technical Support Agreement", entered into by GeoTel Communications Corporation, a predecessor in interest to the current Assignee of the subject application, and Putnam Investments, Inc. of Boston, MA. 1998.

(Continued)

*Primary Examiner*—Harry S. Hong
(74) *Attorney, Agent, or Firm*—Cesari and McKenna, LLP

(57) ABSTRACT

An agent workstation in a computer-telephony system is controlled to provide a fault tolerance technique. A telephony device driver in the workstation is controlled by a server process in the workstation. A first client process interfaces a controller to the server process. The controller is also interfaced to the server process by a second client process, the second client process serving as an alternate interface between the controller and the server process in the event of failure by the first client process. Control of the server process by the controller is transferred from the first client process to the second client process in the event of failure by the first client process.

22 Claims, 7 Drawing Sheets

U.S. PATENT DOCUMENTS

| | | |
|---|---|---|
| 5,073,890 A | 12/1991 | Danielson |
| 5,113,430 A | 5/1992 | Richardson, Jr. et al. |
| 5,134,704 A | 7/1992 | Leuty |
| 5,153,909 A | 10/1992 | Beckle et al. |
| 5,175,866 A | 12/1992 | Childress et al. |
| 5,193,110 A | 3/1993 | Jones et al. |
| 5,214,688 A | 5/1993 | Szlam et al. |
| 5,270,699 A | 12/1993 | Signaigo et al. |
| 5,271,058 A | 12/1993 | Andrews et al. |
| 5,291,492 A | 3/1994 | Andrews et al. |
| 5,291,550 A | 3/1994 | Levy et al. |
| 5,291,551 A | 3/1994 | Conn et al. |
| 5,309,505 A | 5/1994 | Szlam et al. |
| 5,309,513 A | 5/1994 | Rose |
| 5,317,627 A | 5/1994 | Richardson, Jr. et al. |
| 5,335,268 A | 8/1994 | Kelly, Jr. et al. |
| 5,335,269 A | 8/1994 | Steinlicht |
| 5,341,374 A | 8/1994 | Lewen et al. |
| 5,353,339 A | 10/1994 | Scobee |
| 5,355,403 A | 10/1994 | Richardson, Jr. et al. |
| 5,392,345 A | 2/1995 | Otto |
| 5,392,346 A | 2/1995 | Hassler et al. |
| 5,402,474 A | 3/1995 | Miller et al. |
| 5,404,350 A | 4/1995 | DeVito et al. |
| 5,450,482 A | 9/1995 | Chen et al. |
| 5,452,350 A | 9/1995 | Reynolds et al. |
| 5,459,780 A | 10/1995 | Sand |
| 5,546,452 A | 8/1996 | Andrews et al. |
| 5,848,143 A | 12/1998 | Andrews et al. |
| 5,878,130 A | 3/1999 | Andrews et al. |
| 5,910,984 A | 6/1999 | Low |
| 5,923,745 A | 7/1999 | Hurd |
| 5,974,114 A | 10/1999 | Blum et al. |
| 6,002,665 A | 12/1999 | Choe |
| 6,002,756 A | 12/1999 | Lo et al. |
| 6,005,920 A | 12/1999 | Fuller et al. |
| 6,070,142 A | 5/2000 | McDonough et al. |
| 6,134,530 A | 10/2000 | Bunting et al. |
| 6,275,930 B1 | 8/2001 | Bonamico |
| 6,363,065 B1 | 3/2002 | Thornton et al. |
| 6,397,345 B1 | 5/2002 | Edmonds et al. |
| 6,411,621 B1 | 6/2002 | Norton et al. |
| 6,426,955 B1 | 7/2002 | Gossett Dalton, Jr. et al. |
| 6,453,039 B1 | 9/2002 | Cutting et al. |
| 6,522,743 B1 | 2/2003 | Hurd |
| 6,529,959 B1 | 3/2003 | Armistead et al. |
| 6,542,586 B1 | 4/2003 | Helstab |
| 6,553,113 B1 | 4/2003 | Dhir et al. |
| 6,556,672 B1 | 4/2003 | Holland et al. |
| 6,570,855 B1 | 5/2003 | Kung et al. |
| 6,584,093 B1 | 6/2003 | Salama et al. |
| 6,690,789 B1 * | 2/2004 | Hamilton .................... 379/279 |

FOREIGN PATENT DOCUMENTS

| | | |
|---|---|---|
| WO | 96/27254 | 5/1996 |
| WO | 96/02890 | 7/2003 |

OTHER PUBLICATIONS

Slides entitled "Desklink Overview" dated Dec. 2, 1998, were used in oral presentation made to a prospective customer of GeoTel on Dec. 2, 1998.

U.S. Appl. No. 09/652,346, filed Aug. 21, 2000, by Hamilton for a Call Management Implemented Using Call Routing Engine, all pages.

U.S. Appl. No. 09/652,335, filed Aug. 31, 2000 by Hamilton for an Associating Call Appearance With Data Associated With Call, all pages.

Information Disclosure Statement U.S. Appl. No. 09/652, 445, filed Jan. 17, 2001.

U.S. Appl. No. 09/619,875, filed Jul. 20, 2000 by Clifford Atwood et al. for Call Management Implemented Using Call Routing Engine, all pages.

International Search Report PCT/US 96/02890 Foreign Counterpart of US Patent 5,546,452.

International Search Report PCT/US 91/08475.

Microsoft, Microsoft Windows 2000 Server Operating System, IP Telephony with TAPI 3.0, White Paper, Microsoft Corporation, 1999.

* cited by examiner

FAULT TOLERANT TELEPHONY CONTROL

RELATED APPLICATIONS

This U.S. patent application is a Continuation application of U.S. patent application Ser. No. 09/652,445 filed Aug. 31, 2000, now U.S. Pat. No. 6,690,789 B1, which issued on Feb. 10, 2004.

BACKGROUND OF THE INVENTION

1. Field of the Invention

The present invention relates generally to a technique for providing telephony control fault tolerance in a communications system, and more specifically, to such a technique that provides agent workstation telephony control fault tolerance.

2. Brief Description of Related Prior Art

Systems for managing and routing calls through public and/or private communications networks are known in the art. Conventional automatic call distribution (ACD) systems route calls to agents in telemarketing and service inquiry centers, and provide limited real-time call management and reporting capabilities. A typical ACD system will monitor the status of the agent and, when an incoming call is received, selects the agent to handle a particular service request. Reporting and performance data from the agents are also generated by the ACD.

One particular type of scheme for distributing calls to agents is disclosed in Frauenthal et al., U.S. Pat. No. 4,737,983. According to Frauenthal et al., data representing the present call congestion of each of the ACD systems is accumulated in a data base. Using the data in the data base, the percentage of calls made to the ACD systems, as a group, is determined. The information is then used to generate call routing information. When a new call is made to the central office, the routing information is queried to determine which of the ACD systems is to receive the call, so as to balance the call traffic load across the ACD systems.

Another call management and distribution scheme is provided in Gechter et al., U.S. Pat. No. 5,036,535. This patent discloses a system for automatically distributing telephone calls placed over a network to one of a plurality of agent stations connected to the network via service interfaces, and providing status messages to the network. Gechter et al.'s disclosed system includes means for receiving the agent status messages and call arrival messages from the network, which means are connected via a network service interface to the network. Routing means responsive to the receiving means is provided for generating a routing signal provided to the network to connect the incoming call to an agent station through the network. In the system disclosed in Gechter et al., when an incoming call is made to the call router, it decides which agent station should receive the call, establishes a call with that agent station, and then transfers the original call onto the second call to connect the incoming caller directly to the agent station and then drops out of the connection (See, Gechter et al., column 11, lines 45–51).

Other prior art call management, routing, and distribution techniques are disclosed in Andrews et al., U.S. Pat. No. 5,878,130 issued Mar. 2, 1999, which is assigned to the Assignee of the subject application. This patent discloses a communications system and method for automatically making telephone routing decisions with global authority based upon information gathered in real time from the entire communications system and global optimization criteria. The entirety of the disclosure of the Andrews et al. patent is incorporated herein by reference.

Conventional communications systems of the type disclosed in the aforesaid Andrews et al. patent typically comprise one or more ACD systems connected to each other via at least one public switched telephone network (PSTN). The ACD systems and the PSTN may be controlled by a central controller so as to route calls to and from agents (and/or caller services, such as interactive voice response units) associated with such systems, and callers external thereto, through the ACD systems and PSTN.

Unfortunately, conventional ACD systems typically are complex telecommunications devices that are costly to acquire and maintain. Thus, the use of conventional ACD systems in a communications system inherently increases the cost and complexity of implementing, using, and maintaining the communications system.

Accordingly, in an effort to reduce or eliminate the need to use such conventional ACD systems, it has been proposed to provide non-ACD agent systems that exhibit ACD-like functionality and operation in a communication system. In such non-ACD agent systems, a plurality of agent computer-telephony integration (CTI) workstation computer nodes may be provisioned with controllable telephony devices. These telephony devices may be directly connected to the PSTN, or alternatively, may be connected to the PSTN via a PBX to enable certain call operations (e.g., agent conference and consultative call operations, and call transfer operations) to be implemented in the non-ACD agent system. Further alternatively, the telephony devices may be configured to establish and receive Internet Protocol (IP) telephony calls, using voice-over-IP technology, over an IP network. This may offer cost advantages over traditional Plain Old Telephone Service (POTS) telephony, as in contradistinction to POTS telephony, both voice and data may be carried over a single IP network connection; the use of IP telephony has also become more attractive with the widespread and increasing availability of broadband access. The agent workstations, their telephony devices, and the PBX may be controlled by a telephony control mechanism external to the workstations.

More specifically, the control mechanism may comprise at least one telephony control process residing and executing in at least one computer node linked to the workstations via computer network links. This control process controls other telephony control processes (e.g., server processes based upon the telephony application interface (TAPI) protocol of Microsoft Corporation of Redmond, Wash.) resident in the workstations. The TAPI server processes in the workstations control the respective telephony devices in the workstations so as to facilitate implementation of desired call operations.

As is known to those skilled in the art, according to the TAPI protocol, a single respective client process can control only a single respective TAPI server process. Thus, in order to implement the above-described non-ACD agent system, in each agent workstation, a respective TAPI-based client process may be provided to act as a respective interface that permits the establishment of a respective control communication path or link between the telephony control process in the external telephony control mechanism and the respective TAPI server process resident in the workstation. By providing these respective TAPI-based client processes, it becomes possible for the telephony control process in the external telephony control mechanism to control the multiple TAPI server processes in the workstations, and thereby, to control the telephony operations of workstations' telephony devices.

There are a number of ways in which a control communication link between the telephony control process in the external telephony control mechanism and a TAPI-based client process may fail (i.e., experience a failure condition in its operation, such as, ceasing to permit exchange of telephony commands and responses thereto). Examples of events that may cause such a control communication link to fail include the failure of the client process, the failure of the external telephony control process or mechanism, and/or the failure of a network communication link between the workstation and the mechanism. A failure of the client process or the external telephony control process can be caused by, e.g., the experiencing by such processes of an untrapped exception or a deadlock in execution. A failure of a network link or the external telephony control mechanism can be caused by, e.g., a fatal electrical or mechanical failure of the network link or mechanism.

Unfortunately, if the control communication path established by a TAPI-based client process in an agent workstation fails, then it becomes impossible to control the telephony operations of the workstation's telephony device; this can make it impossible for the agent associated with the workstation to properly receive, establish, and process calls using the workstation.

SUMMARY OF THE INVENTION

Accordingly, a telephony control fault tolerance technique is provided that overcomes the aforesaid and other disadvantages and drawbacks of the prior art. More specifically, in one embodiment of the technique of the present invention, a CTI agent workstation node may be provided with a primary telephony control communication path or link between a primary telephony control mechanism external to the workstation and a TAPI process resident in the workstation's memory. The TAPI process may be for use in controlling a telephony device in the workstation. In the event of failure of the primary path, a secondary telephony control communication path or link may be established and activated between the TAPI process and a secondary telephony control mechanism comprised in or local to the workstation.

The primary communication path may be established, at least in part, via a second process resident in the workstation's memory. The second communication path may be established, at least in part, via a third process resident in the workstation's memory.

The TAPI process may be a TAPI server process. The second process may be TAPI-based client process configured to act as an interface that permits the external primary telephony control mechanism to control multiple TAPI server processes (e.g., comprised and executing in respective agent CTI workstations).

The primary telephony control mechanism may be linked to the agent CTI workstations via computer network connections or links. The failure of the primary control path in a workstation may result from one or more of the following: a failure of the second process, a failure of the network connection linking the primary control mechanism to the workstation, and a failure of the telephony control mechanism.

Advantageously, by establishing in an agent workstation, in the event of failure of the primary communication link, a secondary communication link between the first process and the secondary telephony control mechanism, control of the first process may be maintained (e.g., using the secondary control mechanism) even after such failure. This makes it possible to control the telephony operations of the telephony device in the workstation, even after such failure.

It will be appreciated by those skilled in the art that although the following Detailed Description will proceed with reference being made to illustrative embodiments and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

Other features and advantages of the present invention will become apparent as the following Detailed Description proceeds, and upon reference to the Drawings, wherein like numerals depict like parts, and wherein.

It will be appreciated by those skilled in the art that although the following Detailed Description will proceed with reference being made to illustrative embodiments and methods of use, the present invention is not intended to be limited to these embodiments and methods of use. Rather, the present invention is of broad scope and is intended to be defined as only set forth in the accompanying claims.

DETAILED DESCRIPTION OF ILLUSTRATIVE EMBODIMENTS

Figure 1:
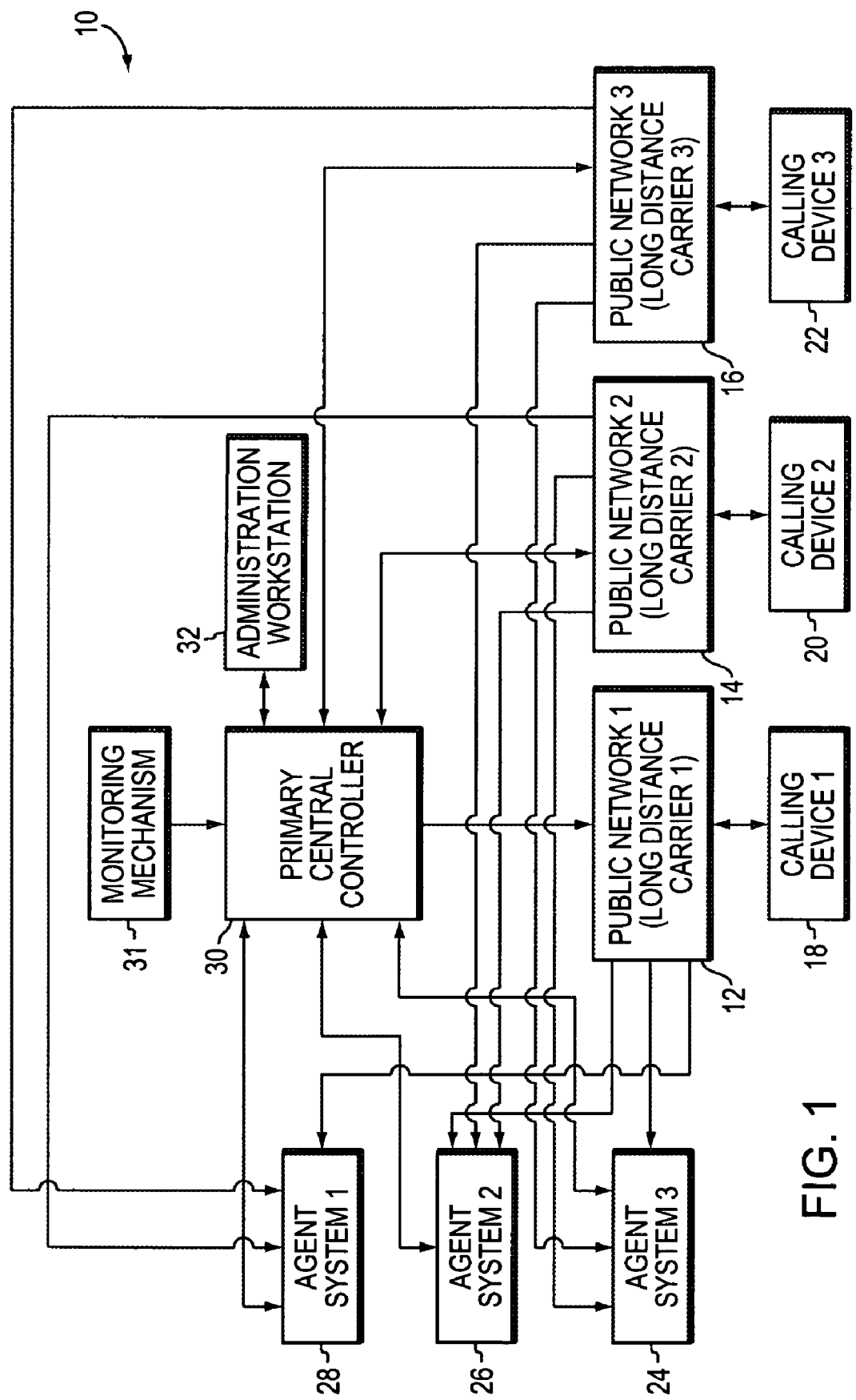
FIG. 1 is a functional block diagram of one embodiment of a communications system wherein the present invention may be practiced to advantage.

FIG. 1 is an architectural-level block diagram illustrating functional components of a communications system 10 wherein the present invention may be practiced. System 10 includes a plurality of agent systems 24, 26, 28 connected to a primary central controller 30 and a plurality of public telephone and/or long distance carrier networks (e.g., British Telecom, Energis, France Telecom, Cable and Wireless, MCI, Sprint, AT&T) 12, 14, 16. Calling devices 18, 20, 22 place calls to called devices (i.e., agent systems 24, 26, 28) via public networks 12, 14, 16. As will be explained more fully below, primary central controller 30 generates command messages for controlling routing and distribution of calls through the long distance carriers to and from the agent systems, and through the agent systems themselves to and from individual workgroups, agents and/or caller services, based upon requested service messages (e.g., telephone numbers and/or other information and messages supplied from the calling devices and public networks, and/or call management request messages from the called devices), status messages (i.e., availability of resources for use by callers, loading of system resources, etc.) supplied by the agent systems, and user-generated call routing control scripts) stored in controller 30. Administration workstation 32 permits user access and control of the system 10 by, for example, permitting generation and modification of system configuration data, call routing scripts, etc. stored in controller 30. Monitoring and diagnostic mechanism 31 monitors the various elements of the system (i.e., the agent systems 24, 26, 28, administration means 32, etc.) to determine whether these elements are functioning properly. If a malfunction is detected, that fact is signaled to the central controller 30, so that it can undertake appropriate action to correct and/or eliminate the malfunction and/or any resulting problems to the system 10 from the malfunction.

Although not shown in the Figures, each of the conventional long distance carriers 12, 14, 16 includes a long distance control network (e.g., AT&T's Signaling System 7 (SS7) control network, MCI's TCP/IP-based control network, Sprint's X.25-based control network and/or foreign telecommunication's CCITT SS7-based control network) and local exchange carriers. The long distance control networks control routing of calls through the long distance network serviced by the exchange carriers. When a long distance call request is initially received by the exchange carrier, from a calling device (e.g., a caller at a calling device dials a long distance telephone number) it forwards the call request to the long distance network, which routes the call to its intended destination. In system 10, when the long distance control network receives a request for long distance connection to one of the agents in the agent systems' workgroups or caller services, the long distance control network forwards the long distance routing request to the central controller 30. As will be described more fully below, central controller 30 then processes the request and controls the system 10 to route the call to a destination in accordance with call routing control scripts executed by the controller 30. The system 10 accomplishes call routing by, inter alia, translating the routing request message into a route response or command message that addresses the desired destination. System 10 also supports routing of calls across local exchange carriers and international PTT's by utilizing substantially the same call control and distribution techniques discussed above.

As is known to those skilled in the art, call destinations are commonly termed "labels." A "label" may be or specify, e.g., a particular destination telephone number.

Figure 2:
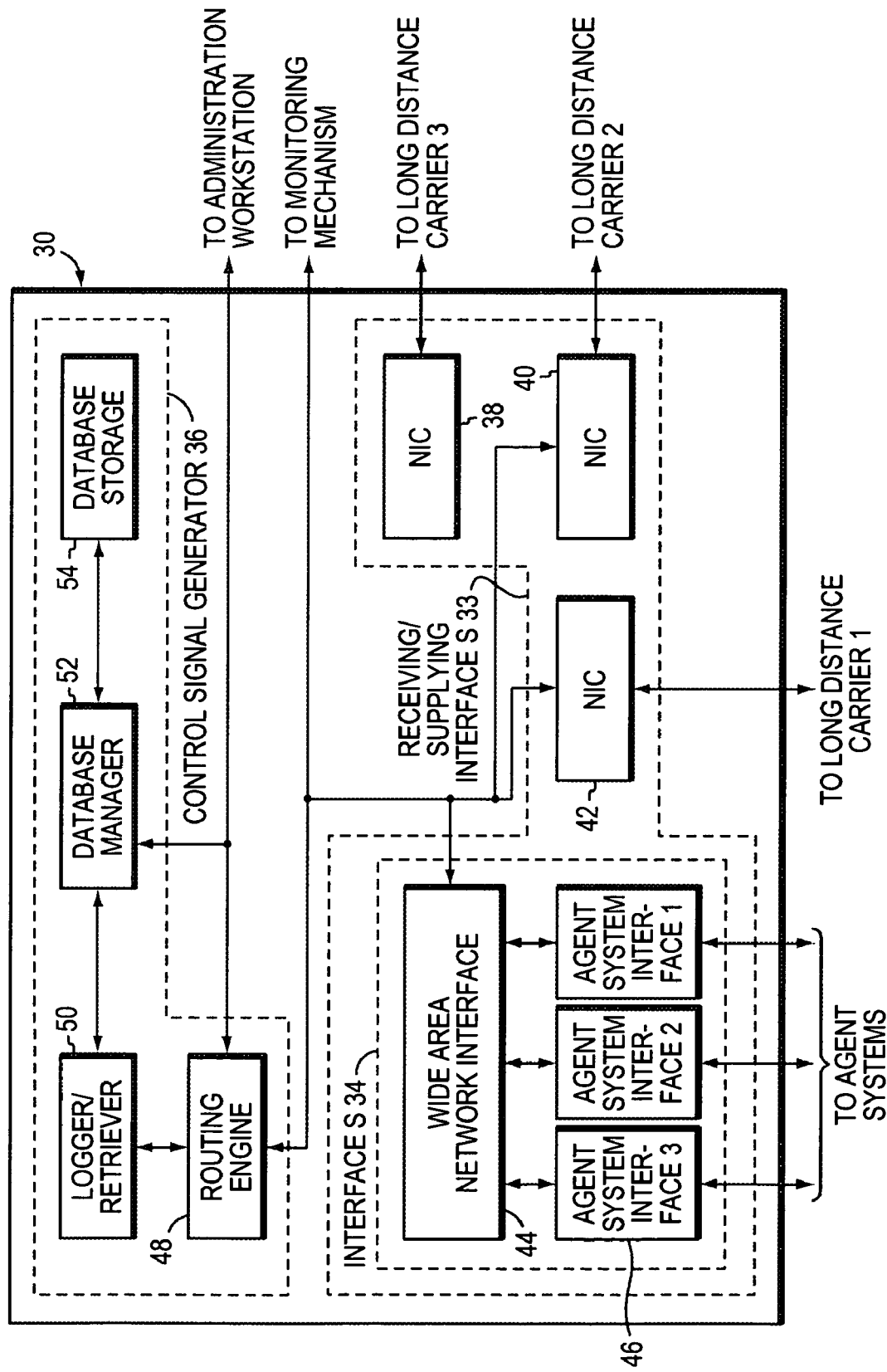
FIG. 2 is a functional block diagram of the primary central controller of the system of FIG. 1.

FIG. 2 is a schematic block diagram illustrating functional components of the central controller 30. Controller 30 includes interfaces 33 for receiving status and requested service messages, and for supplying command messages generating by the controller 30 to the public networks and the agent systems. Interfaces 33 include long distance carrier network interface controllers (NICs) 38, 40, 42 that interface the controller 30 to the public networks 12, 14, 16, respectively. Each of the NICs 38, 40, 42 is appropriately constructed to permit transmission of command messages to and receipt of requested service and other messages from the respective network to which it is connected. For example, if NIC 42 is connected to an AT&T network, then it is appropriately constructed to permit transfer of command and requested service messages between the controller 30 and the SS7 network; additionally, the NIC 42 may be constructed to receive and process from the SS7 network confirmation messages that confirm that command messages provided to the SS7 are proper for the SS7 network and have or are being acted upon by the SS7 network. Other types of carriers must also be similarly accommodated by appropriately constructing the other NICs 40, 38 to permit exchange of such messages between these networks and the controller 30.

Interfaces 33 also include agent interfaces 34 for interfacing the controller 30 to the agent systems 24, 26, 28. Interfaces 34 include agent system interfaces 46 connected to a conventional wide area network interface 44 which connects the controller 30 to the interfaces 34 so as to permit transmission of status and other messages from the agent systems to the routing engine 48, and to permit transmission of command and other messages to the agent systems 24, 26, 28. It should be understood that the particular types of interfaces 46 used will depend upon the particular constructions of the agent systems, the wide area network (not shown) that connects the controller to the agent systems, and the controller itself. Interface 44 may be adapted for use with a conventional TCP/IP (Transmission Control Protocol/Internet Protocol) network (not shown, which connects the controller to the agent systems), although alternatively, interface 44 may be constructed for use with networks that use other network protocols.

Figure 5:
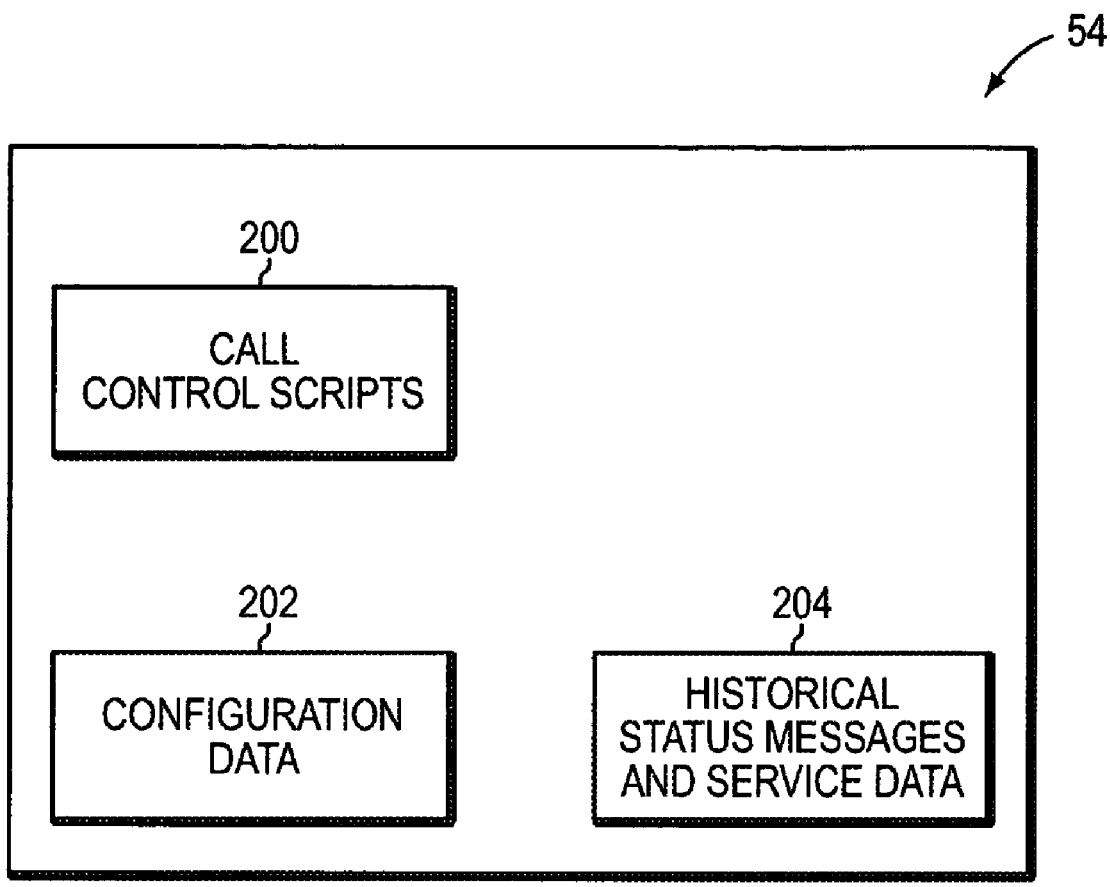
FIG. 5 is a schematic block diagram illustrating data structures in the database shown in FIG. 4.

Control signal generator 36 is connected to the interfaces 33, monitoring mechanism 31, and administrative workstation 32. Control signal generator 36 comprises routing engine 48, database logger/retrieving engine 50, database manager 52, and database 54. Routing engine 48 determines how to route calls in the system 10 (i.e., through the public networks to the agent systems, and in the agent systems themselves), and transmits this routing information (e.g., in the form of appropriate command messages) that address the desired end-termination (e.g., an agent station or CTI workstation in a workgroup or a caller service in the system) to interfaces 33, 34 for transmission to the agent systems and long distance control networks, respectively. In order to determine how to route calls in the system, routing engine 48 may take into consideration, among other things, real-time requested service messages supplied to it by the interfaces 33, system configuration data 202 (see FIG. 5) and historical (i.e., previously stored) requested service data derived from requested service messages and status messages 204 retrieved by logger/retriever 50 at the command of the routing engine 48 from the system's historical database (comprising database manager 52 and storage mechanism 54), real-time status messages from the agent systems supplied to it from the interfaces 34, information from the monitoring mechanism 31 concerning what components (if any) of the system are currently unavailable because they are malfunctioning or inoperative, and routing optimization criteria and/or rules and commands in the form of call routing control scripts 200 generated by the administration workstation and stored in database 54. Routine engine 48 uses this data to determine the manner in which to route calls in the system. After making its decision on how best to route a particular call, generating appropriate command messages to implement this decision, and transmitting the command messages to the interfaces 33 and 34, routing engine 48 instructs logging engine 50 to store the real-time information presented above in the database 54 for use in determining how to route later calls. Logging engine 50 in turn, commands database manager 52 to store this information in database 54.

Figure 3:
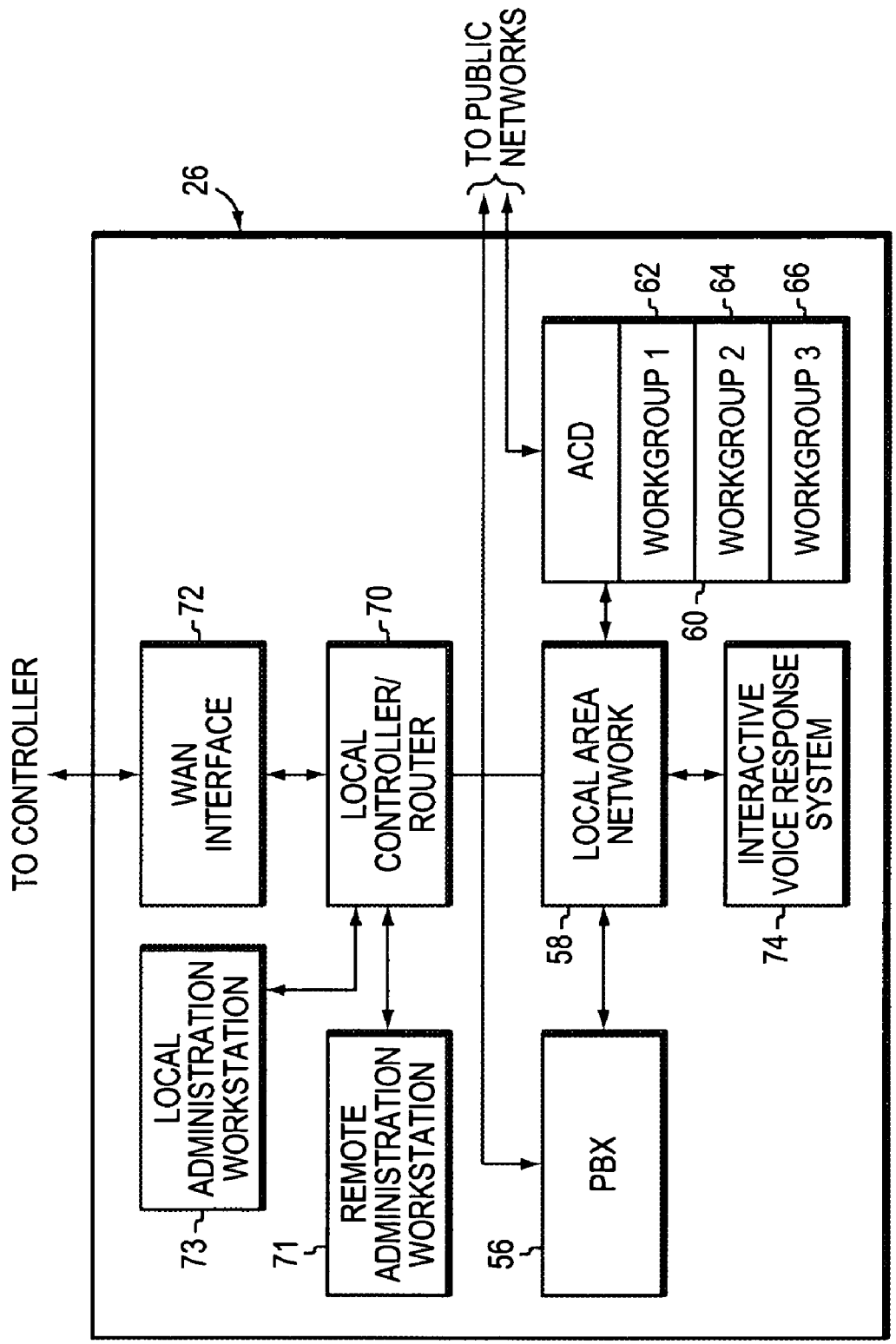
FIG. 3 is a functional block diagram of one type of agent system that may be used in the system of FIG. 1.

FIG. 3 is a functional block diagram of one type of agent system that may be used in the system of FIG. 1. Agent system 26 comprises an interface 72 for interfacing the agent system's local controller/router 70 to the controller's wide area network interface 44, so as to permit transfer of command and other messages from controller 30 to local controller 70 and status and other messages from the local controller 70 to controller 30. In response to command and other messages received by local router 70 from controller 30, local router 70 issues commands to the ACD/IVR, or PBX system causing public network interfaces (not shown) in the ACD, PBX or IVR to connect and disconnect calls received therefrom from the public networks to and from appropriate caller services (e.g. interactive voice response system 74) or individual agents (e.g. connected to private branch exchange (PBX) 56 or ACD 60). It should be noted that the particular type and number of caller services and agent workgroups shown in FIG. 3 are merely for illustrative purposes and may vary. Local router 70 issues commands via the conventional local network 58 to the caller service or individual agent system in the workgroup to which the call is connected, as to how the individual agent or caller service is to distribute or process the call. For example, depending upon the command messages transmitted by the controller 30 to controller 70, controller 70 may instruct the call to be forwarded directly to the interactive voice response system 74 which is connected as an answering resource to ACD 60, and instruct the interactive voice response system to store information from the call for later retrieval and transmission to a workstation (not shown) connected to the PBX 56, or to connect the call to the ACD 60 and instruct the ACD to forward the call to one of its workgroups 62, 64, 66. Of course, it will be appreciated that if appropriately modified, the network interfaces may be comprised within the public networks or may comprise separate, stand-alone interfaces distinct from the agent systems. Likewise, if the PBX, IVR, and/or ACD are appropriately modified so as to include other of the various functional components of the agents (e.g. router 70), they may be eliminated, or comprised as separate functional components from the agent system. Local controller 70 also queries the individual agents and caller services for status information (e.g. whether they are active or busy, what resources are available for use by callers, etc.), gathers this status information via the local network 58, and transmits this information to the central controller 30 via interface 72 for use in the central controller's routing decisions.

Agent system 26 may also comprise local administration workstation 73 for permitting user control of the local router 70, and remote administration workstation 71 for permitting remote control of central controller 30. Both administration workstations 73, 71 are of similar construction to administration workstation 32. Local administration workstation 73 may be limited in its ability to control local router 70 (i.e., only to control matters not being controlled by central controller 30). Likewise, remote administration workstation 71 may be limited in its authority over system 10 such that administration workstation 32 may override commands issued by administration workstation 71.

Figure 4:
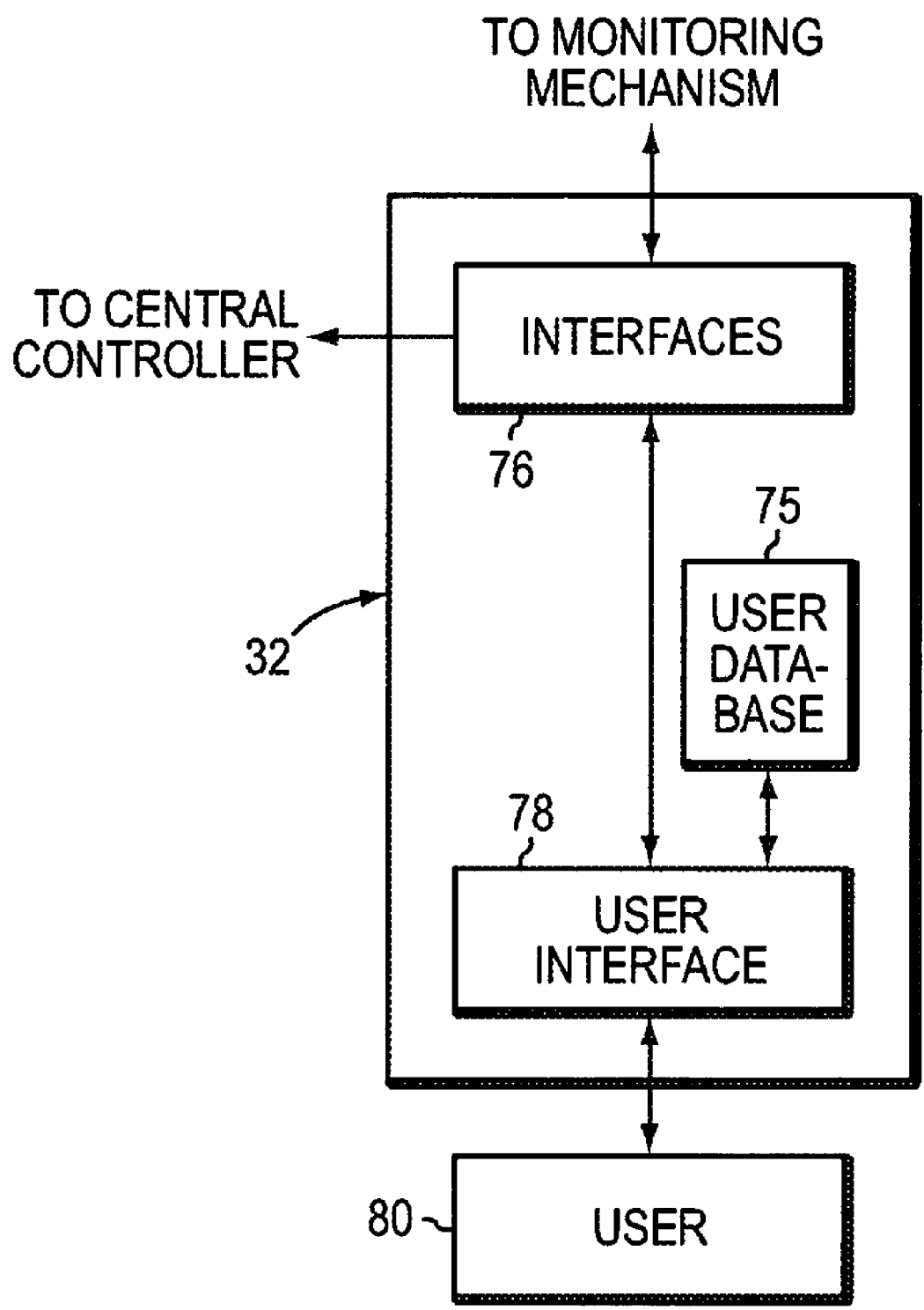
FIG. 4 is a functional block diagram of an administrative workstation used in the system of FIG. 1.

FIG. 4 is a functional block diagram of administration workstation 32. Workstation 32 may comprise a user input/output interface 78 connected to central controller interface 76. User interface 78 may comprise a graphical user interface for permitting a human user 80 to generate, edit, and store call control routing scripts 200, system configuration data 202, etc. in the database 54 of the central controller 30. The database interface 76 is adapted to change the user's graphically input data into a form usable by the central controller in the central controller's database 54. Administration workstation 32 comprises a user-accessible database 75 for storing real-time information and configuration information and for permitting such information to be communicated to a human user via the user interface 78. Also, administration workstation 32 permits a user to monitor various system activities and current system information, such as, call routing, system configuration, etc.

Figure 6:
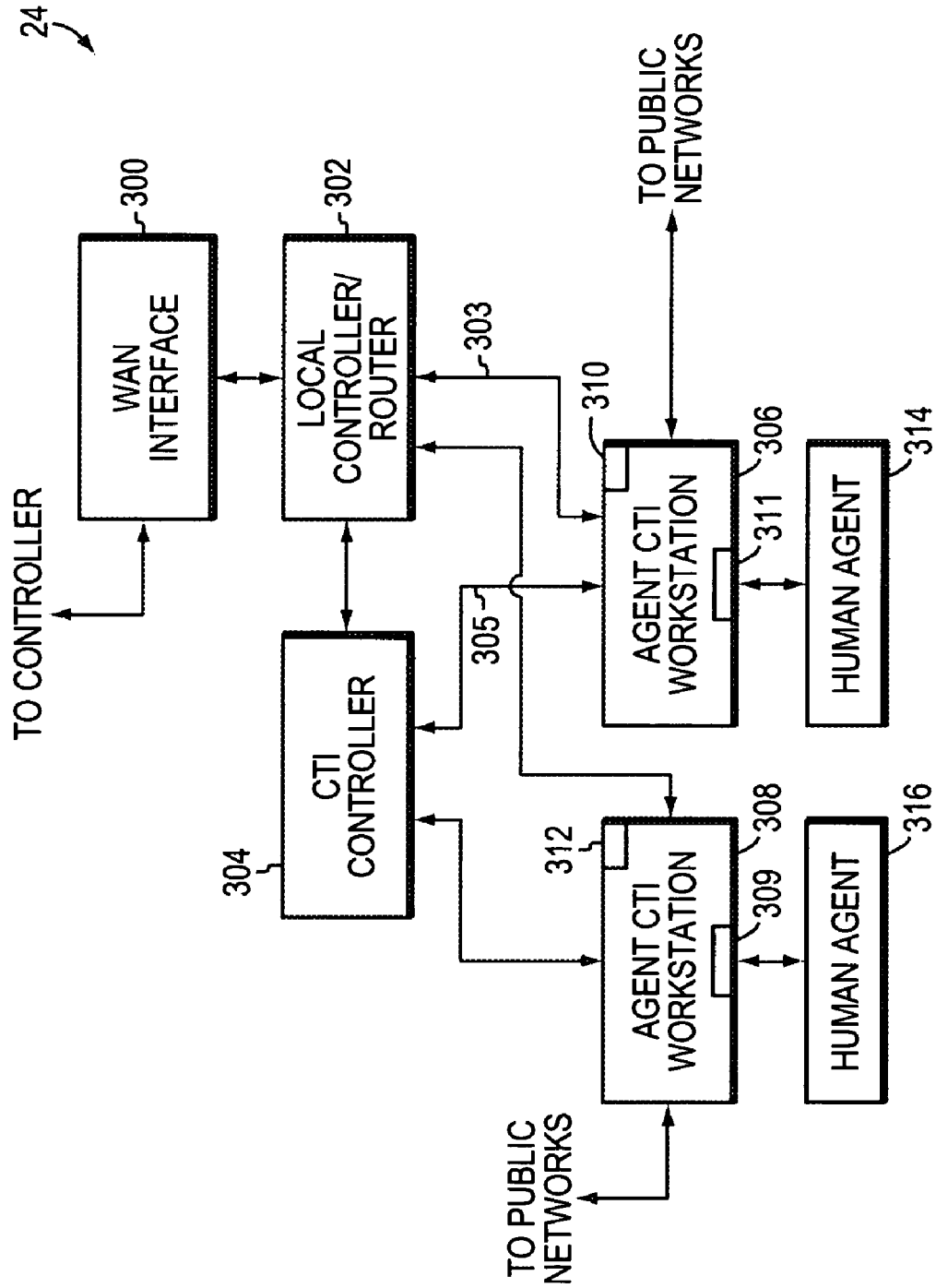
FIG. 6 is a functional block diagram of another type of agent system that may be used in the system of FIG. 1.

FIG. 6 is a functional block diagram of another type of agent system 24 that may be used in system 10. In contrast to the agent system 26 whose construction is illustrated in FIG. 3, the agent system 24 does not include an ACD system. Instead, as will be described more fully below, agent system 24 comprises, among other things, a plurality of computer program processes executing in a plurality of computer nodes that operate in a such a way as to permit agent system 24 to exhibit certain ACD-like functionalities. As is shown in FIG. 6, non-ACD agent system 24 comprises a wide area network interface 300 for interfacing the local controller/router 302 of the agent system 24 to the wide area network interface 44 of the central controller 30, so as to permit transfer of command and other messages from controller 30 to local controller 302 and status and other messages (including CTI event status messages) from the local controller 302 to controller 30. In response to command and other messages received by local controller 302 from the central controller 30, local controller 302 issues commands and data to the CTI controller 304, and also issues commands to the agent CTI workstations 306, 308.

More specifically, each workstation 306, 308 comprises respective telephony-related hardware and executing software processes (e.g., based upon TAPI protocol) that permit the workstations 306, 308 to receive and process incoming calls from, and to establish outgoing calls to, the networks 12, 14, 16. By controlling the hardware and software processes, controller 302 is able to control the telephony operations of the workstations 306, 308, including answering and termination of incoming calls, and establishment and termination of outgoing calls. The telephony hardware may also include conventional mechanisms (e.g., comprising respective agent telephone headsets and mouthpieces) for permitting the agents 314, 316 to communicate with the callers involved in such incoming and outgoing calls, and conventional mechanisms for providing physical connectivity to the networks 12, 14, 16 (e.g., comprising respective Music Telecom 1×1™ telephony device cards 310, 312). Alternatively, if the workstations receive and establish IP telephony calls, the network(s) 12, 14, 16 may comprise one or more IP networks (which may comprise or be comprised in the same data network that includes CTI controller 304) via which such calls may be received or established. In this alternative arrangement, the devices 310, 312 may comprise Windows 2000™ h323 client and/or Section Initialed Protocol (SIP) TAPI service provider processes/devices for facilitating establishment of voice-over-IP telephony calls over such IP networks.

The commands and data issued by the controller 302 to the controller 304 may control the provision of, among other things, agent status and call processing-related information from the controller 304 to application processes (not shown) executing in the individual workstations 306, 308. For example, based upon commands and data that it receives from the local controller 302, CTI controller 304 may gather information related to the processing of calls by, and the current status of, the workstations 306, 308 and agent system 24, and may provide that information to these application processes, and to the controller 302. Such information may include, e.g., whether a particular agent workstation is busy (i.e., actively "off-hook" and connected to a call), waiting to receive a call, connected to an as yet unanswered call, available to receive a call, etc. These application programs may then use computer/user interfaces 311, 309 to display this information in a form that is understandable by human agents 314, 316, respectively, so as to permit the agents 314, 316 to be able to monitor the processing of calls by their respective workstations 306, 308 and by the system 24. These application program processes and interfaces 311, 309 also provide a mechanism by which agents 314, 316 may request the establishment of outbound calls from the agent system 24 via one or more of the networks 12, 14, 16, using an embodiment of the technique of the present invention, and may request changes in respective statuses of the workstations 306, 308 (e.g., the agents 314, 316 may request the termination of particular calls received or initiated by the workstations).

Controller 304 may also provide, based upon commands and data received from the controller 302, call context information concerning particular calls received by the workstations. The contents of such call context information may vary, and for example, may include ANI-related information, digits entered or dialed by the caller placing the call, customer account number and/or other information related to previous business transactions made by the caller, and/or other call-identification-related information. The call context information may be initially gathered by, and forwarded to, the controller 302 by the controller 30. Agent system 28 may have the same construction and operation as agent system 24.

The above-presented functional components (with the exception of public networks 12, 14, and 16 and PBX 56 and ACD system 60 of agent system 26) of system 10 may be embodied as, or comprise one or more distributed computer program processes executing in a plurality of computer nodes; each of these nodes may include computer-readable memory for storing software programs, algorithms, and data structures associated with, and for carrying out, the inventive techniques, and related and other techniques and methods described herein as being carried out by or implemented in system 10. In addition, each of these nodes may further include a processor (e.g., an Intel 80×86 processor) for executing these software programs and algorithms, and for manipulating the stored data structures, to enable the nodes to carry out these methods and techniques in system 10. Additionally, the nodes may be provisioned with such networking hardware and software (e.g., including computer networking and telephonic communications hardware and software) as is needed to enable performance of the stated functionality.

It should be noted that the functional components of the system 10 may vary depending upon particular functional and operational requirements. For example, the existing components of system 10 may be modified to incorporate the functionality of, or the system 10 may be modified to include, fault-tolerance-related functional components (e.g., a redundant central controller), components related to processing of Internet calls, and/or call-queuing-related components described in the aforesaid Andrews et al. patent (i.e., U.S. Pat. No. 5,878,130 issued Mar. 2, 1999). Accordingly, it should be appreciated that the present invention may be practiced in systems other than system 10 (e.g., in systems having different and/or additional functional components like those described in the aforesaid Andrews et al. patent, and other communications systems).

Figure 7:
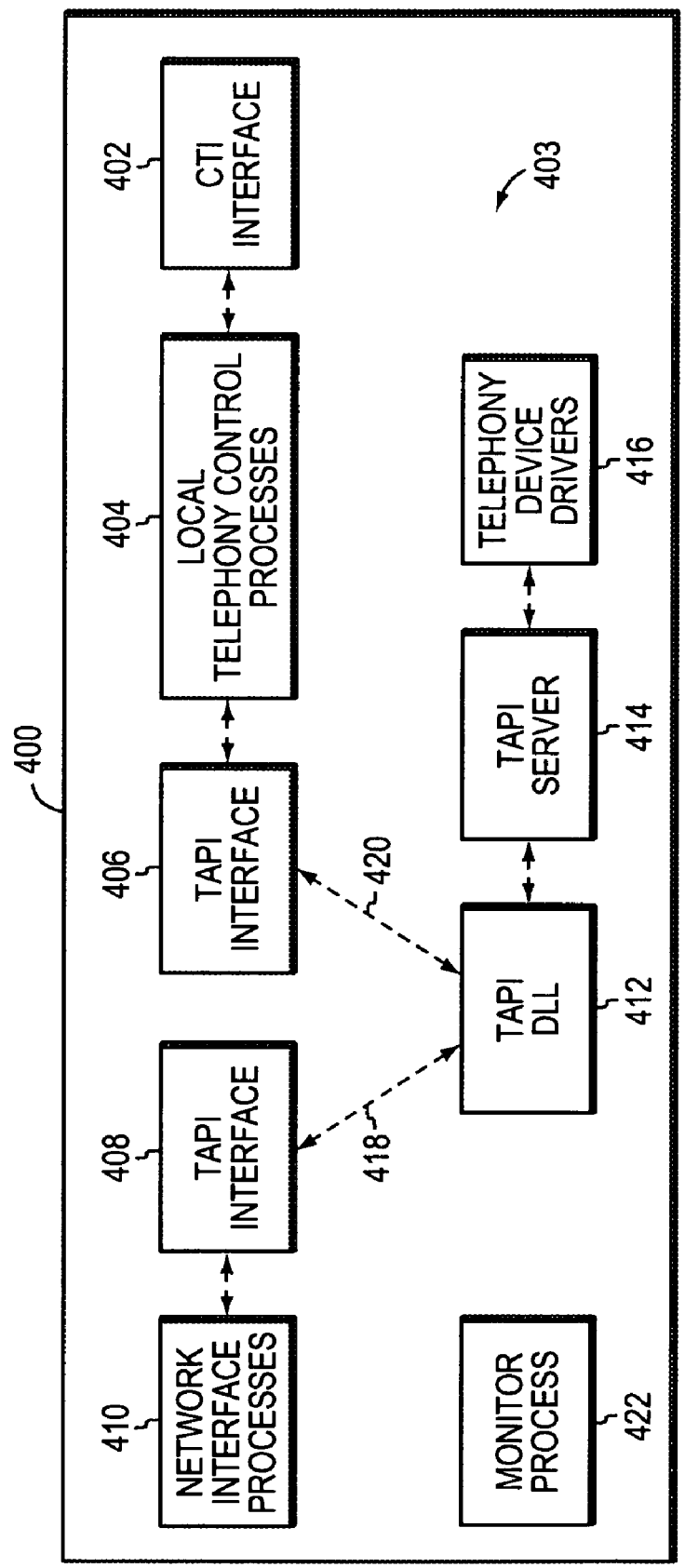
FIG. 7 is a functional block diagram illustrating computer program processes that may be resident in the memory in an agent CTI computer workstation node in accordance with one embodiment of the present invention.

FIG. 7 illustrates a respective set 403 of telephony control computer program processes, according to one embodiment of the present invention, that may be resident and executing in the respective computer-readable memory (e.g., comprising random access and/or read-only memory) 400 in an agent workstation (e.g., workstation 306) of the agent system 24. Each of the other CTI agent workstations in agent systems of the type shown in FIG. 6 may comprise respective sets of processes that are substantially similar to processes 403. As shown in FIG. 7, processes 403 include low-level telephony device driver and related processes 416 that directly control the operation of the telephony device 310 in workstation 306, and receive from the device 310 information related to the status and operation of the device 310. Processes 416 are controlled by a TAPI server process 414, which process 414 receives from the processes 416 messages indicative of the information received by the processes 416 from the device 310.

As stated previously, controller 302 provides telephony control commands to the workstation 306 that control the telephony operations of the device 310. More specifically, in accordance with this embodiment of the present invention, agent workstation telephony control processes (not shown) resident and executing in computer-readable memory in controller 302 provide, via a computer network communications link 303 (e.g., comprising a wide or local area TCP/IP-based network link), telephony control command messages to the network interface processes 410 in memory 400 of workstation 306. These command messages are converted by processes 410 into a form suitable for receipt and processing by a TAPI client process 408.

TAPI client process 408 and TAPI server process 414 may communicate with each other using conventional functions/ protocols provided by TAPI Dynamic Link Library (DLL) program code provided by the Microsoft Corporation of Redmond, Wash. That is, process 408 may provide telephony command messages to process 414, and process 414 may provide to process 408 messages indicative of the information received by the processes 416 from the device 310, by invoking/utilizing the conventional functions/protocols provided by TAPI DLL program code. The command messages from the process 408 may reflect or be indicative of command messages received by the processes 410 from the controller 302. Messages received by the process 408 from the server process 414 may be converted by processes 410 into form suitable for transmission to the controller 302 via the link 303, and being so converted, may be transmitted by the processes 410 via the link 303 to the controller 302.

In essence, TAPI client process 408 acts as an interface between the telephony control processes in controller 302 and the TAPI server process 414 that permits the establishment of a primary control communication path or link between the telephony control processes in controller 302 and the process 414 that permits the telephony control processes in controller 302 both to control the telephony operations of the device 310 and to receive information related to the status and operation of the device 310. The processes 408 in the workstations 306, 308 are constructed such that, by providing in each agent workstation a respective TAPI process 408, the telephony control processes in controller 302 may separately address and control each of the server processes 414 in the respective workstations, and separately associate telephony status messages from such processes 414 with the respective workstations in which the processes 414 reside.

In accordance with this embodiment of the present invention, a secondary TAPI interface client process 406 is resident and executing in memory 400. A monitoring process 422 is also resident and executing in the memory 400. Process 422 periodically polls (via provision of appropriate polling messages to the primary interface process 408) the process 408 to determine whether process 408 is functioning properly. If the process 408 does not properly respond to such polling messages from the process 406, the process 422 determines therefrom that the process 408 has failed. Failure of the process 408 inherently causes the link 418 to fail, and may be caused directly by failure of the process 408. A failure of the process 408 may be caused by, e.g., the experiencing by the process 408 of an untrapped exception or a deadlock in execution. When process 422 determines that process 408 has failed, process 422 may terminate and restart the process 408, and may provide appropriate messages to the process 406 to cause secondary link 420 to become active.

Alternatively, the link 418 may fail as a result of failure of link 303 and/or CTI network link 305. A failure of link 303 may be caused by, e.g., a fatal electrical or mechanical failure of the network link 303 itself or controller 302. A failure of the CTI network link 305 may be caused by e.g., a fatal electrical or mechanical failure of the network link 305, itself or controller 304. Assuming that process 408 is functioning normally, process 408 may determine that link 303 or link 305 has failed if, e.g., process 408 repeatedly fails to receive responses to messages sent by process 408 via links 303, 305. When process 408 determines that either link 303 or link 305 has failed, it may close primary link 418, and then cause process 406 to active the secondary link 420 (e.g., via invoking an appropriate TAPI "lineHandoff" procedure). Additionally, controller 302 periodically polls the process 408 to determine whether the process 408 is active (i.e., has not failed); if the controller 302 determines that the process 408 has failed, and the link 303 has not failed, the controller 302 may cause local Active-X-based telephony control processes 404 resident and executing in memory 400 to cause the process 406 to activate secondary link 420. Also, if the controller 304 determines that the process has become unresponsive, and the link 305 had not failed, the controller 304 may transmit appropriate messages via interface processes 402 that command the local control processes 404 to cause the secondary link 420 to become active. Alternatively, the controllers 302, 304 may command the local Active-X-based telephony control processes 404 to provide the agent with an indication that process 408 has failed. Based upon this information, the agent 314 may command the processes 404 to cause the process 406 to make active the link 420.

During normal conditions, the process 406 receives copies of the messages sent by the process 414 to the process 408, but does not act upon any of these received messages. The agent 314 may provide commands to the processes 404 via the interface 311 that control the telephony operations of the device 310 so as to permit the agent 314 to continue, e.g., to properly receive, establish, and process calls using the workstation 306, despite the failure of the link 418. More specifically, when the processes 404 receive such commands from the agent 314, the processes 404 may command the process 406 to command the server process 414 to implement the commands from the agent 314. In response to such commands from the processes 404, the process 406 may issue appropriate commands to the server process 414 that, when executed by the process 414, cause the processes 416 to cause the device 310 to implement the telephony operations commanded by the agent 314. The process 406 exchanges messages with the process 414 using the TAPI DLL program code in a manner similar to that used by the process 408 (i.e., in the absence of a failure of the link 418).

Thus, after the process 408 has failed, the processes 404 may use process 406 to establish a secondary control communications link 420 between the local telephony control processes 404 and the server process 414 that permits the processes 404 to function as a secondary mechanism (in contradistinction to the primary mechanism provided by the controller 302) for controlling the telephony operations of the device 310 of workstation 306. However, unless and until the process 408 has failed, the link 420 does not become active for use by the control processes 404.

Further details of the construction and operation of system 10 (and particularly, of the non-ACD agent system 24) are disclosed in U.S. Pat. No. 6,623,933, issued on Sep. 23, 2003, entitled "Call Management Implemented Using Call Routing Engine," and U.S. Pat. No. 6,801,613, issued on Oct. 5, 2004, entitled, "Associating Call Appearance With Data Associated With Call." Each of said patents was filed concurrently with the subject application and is assigned to the Assignee of the subject application. Each of said patents are also hereby incorporated by reference, in its entirety, into the subject application.

It should be understood that above-described embodiments are being presented herein as examples and that many variations and alternatives thereof are possible. Accordingly, the present invention should be viewed broadly as being defined only as set forth in the hereinafter appended claims.

What is claimed is:

1. A method for controlling an agent workstation in a computer-telephony system, comprising:
   controlling a telephony device driver in the workstation by a server process in the workstation;
   interfacing a controller external to the workstation by a first client process to the server process;
   interfacing the controller to the server process by a second client process, the second client process serving as an alternate interface between the controller and the server process in the event of failure by the first client process; and
   transferring control of the server process by the controller from the first client process to the second client process in the event of failure by the first client process.

2. The method as in claim 1, further comprising:
   providing the first client process and the second client process in the workstation.

3. The method as in claim 1, further comprising:
   providing the server process in the workstation as a telephony application program interface (TAPI) server process.

4. The method as in claim 1, further comprising:
   providing the first client process and the second client process as telephony application program interface (TAPI) client processes.

5. The method as in claim 1, further comprising:
   linking the controller to the first client process by a computer network connection.

6. The method as in claim 1, further comprising:
   linking the controller to the second client process by a computer network connection.

7. The method of claim 1, further comprising:
   failing by the first client process by a failure in the first client process.

8. The method of claim 1, further comprising:
   failing by the first client process by a failure of a network connection linking the controller to the first client process.

9. The method of claim 1, further comprising:
   failing by the first client process by a failure in the server process.

10. An apparatus to control an agent workstation in a computer-telephony system, comprising:
    means for controlling a telephony device driver in the workstation by a server process in the workstation;
    means for interfacing a controller external to the workstation by a first client process to the server process;

means for interfacing the controller to the server process by a second client process, the second client process serving as an alternate interface between the controller and the server process in the event of failure by the first client process; and means for transferring control of the server process by the controller from the first client process to the second client process in the event of failure by the first client process.

11. The apparatus as in claim 10, further comprising:
the first client process and the second client process are in the workstation.

12. The apparatus as in claim 10, further comprising:
the server process in the workstation is a telephony application program interface (TAPI) server process.

13. The apparatus as in claim 10, further comprising:
the first client process and the second client process are telephony application program interface (TAPI) client processes.

14. The apparatus as in claim 10, further comprising:
means for linking the controller to the first client process by a computer network connection.

15. The apparatus as in claim 10, further comprising:
means for linking the controller to the second client process by a computer network connection.

16. The apparatus as in claim 10, further comprising:
the first client process fails by a failure in the first client process.

17. The apparatus as in claim 10, further comprising:
the first client process fails by a failure of a network connection linking the controller to the first client process.

18. The apparatus as in claim 10, further comprising:
the first client process fails by a failure in the server process.

19. An apparatus to control an agent workstation in a computer-telephony system, comprising:
a server process in the workstation to control a telephony device driver in the workstation;

a controller external to the workstation interfaced by a first client process to the server process;

a second client process interfaced to the controller, the second client process serving as an alternate interface between the controller and the server process in the event of failure by the first client process; and means for transferring control of the server process by the controller from the first client process to the second client process in the event of failure by the first client process.

20. Electromagnetic signals propagating on a computer network, comprising:
said electromagnetic signals carrying information having instructions for execution on a processor for the practice of the method of claim 1.

21. Computer readable media, comprising:
said computer readable media having information written thereon, said information having instructions for execution on a processor for the practice of the method of claim 1.

22. An apparatus to control an agent workstation in a computer-telephony system, comprising:
a telephony application (TAPI) server to communicate telephony control commands in the agent workstation;

a controller external to the workstation interfaced by a first TAPI interface to the TAPI server;

a second TAPI interface interfaced to the controller, the second TAPI interface serving as an alternate interface between the controller and the TAPI server in the event of failure by the first TAPI interface; and a monitor to monitor and transfer control of the TAPI server from the first TAPI interface to the second TAPI interface in the event of failure by the first TAPI interface.

* * * * *